US008284719B2

(12) United States Patent  (10) Patent No.: US 8,284,719 B2
Wenger et al.  (45) Date of Patent: Oct. 9, 2012

(54) METHOD FOR CALL SETUP TIME IMPROVEMENT

(75) Inventors: Stephan Wenger, Tampere (FI); Tapio Hinkkanen, Tampere (FI); Ralph Neff, San Diego, CA (US)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 11/643,682

(22) Filed: Dec. 22, 2006

(65) Prior Publication Data
US 2007/0237112 A1 Oct. 11, 2007

Related U.S. Application Data

(60) Provisional application No. 60/789,159, filed on Apr. 5, 2006.

(51) Int. Cl.
*H04W 4/00* (2009.01)
(52) U.S. Cl. .......................................... 370/329
(58) Field of Classification Search ................... 370/431, 370/432, 433, 329
See application file for complete search history.

(56) References Cited

U.S. PATENT DOCUMENTS

| | | | | |
|---|---|---|---|---|
| 5,495,295 | A * | 2/1996 | Long | 348/563 |
| 6,130,883 | A * | 10/2000 | Spear et al. | 370/328 |
| 2005/0074025 | A1 * | 4/2005 | Shao et al. | 370/461 |
| 2007/0129052 | A1 * | 6/2007 | Jabri et al. | 455/403 |

FOREIGN PATENT DOCUMENTS

| | | |
|---|---|---|
| JP | 2006-510242 A | 3/2006 |
| WO | WO-2004054221 A1 | 6/2004 |
| WO | WO-2005055556 A1 | 6/2005 |
| WO | 2006/004517 | 1/2006 |
| WO | WO 2006/004517 A1 | 1/2006 |
| WO | WO-2006020031 A2 | 2/2006 |
| WO | WO-2007113699 A2 | 10/2007 |

OTHER PUBLICATIONS

Marwan A. Jabri, et al., "The 3G-324M Protocol for Conversational Video Telephony," IEEE Multimedia, Jul. 2004, pp. 102-105, vol. 11, No. 3, IEEE Computer Society, USA.

"Reducing 3G Call Session Setup Time Using Accelerated Setup Methods," Dilithium Networks, Internet Citation, Sep. 2005, pp. 1-18, Retrieved from the Internet on Feb. 23, 2006: <dilithiumnetworks.com/technology/whitepatpers.htm>.

"Call Setup Investigation Ad-Hoc Metting Summary," Chair H.324M Call Setup Investigation Ad Hoc Group, TD 264 (WP 2/16), ITU-T, International Telecommunication Union, Apr. 3-13, 2006, pp. 1-2, Geneva, CH.

(Continued)

*Primary Examiner* — Anh-Vu Ly
*Assistant Examiner* — Mohammad Anwar
(74) *Attorney, Agent, or Firm* — Mintz, Levin, Cohn, Ferris, Glovsky & Popeo, PC

(57) ABSTRACT

A method for providing fast and flexible call setup, the method comprising establishing a plurality of phantom channels over a bearer channel, wherein at least one of the plurality of phantom channels is pre-assigned to a first session negotiation method, at least one of remaining phantom channels of the plurality of phantom channels is pre-assigned to a second session negotiation method, the second session negotiation method has at least one property different from the first session negotiation method, and at least one of the remaining phantom channels is assigned to at least one fixed media operation point, whereby the first session negotiation method is utilized for flexible session setup.

20 Claims, 3 Drawing Sheets

OTHER PUBLICATIONS

PCT International Search Report, International Application No. PCT/IB2007/050840, Date of Mailing: Sep. 7, 2007, pp. 1-5.

Brody Kenrick et al., Proposal of a Simplified Fast Session Setup Procedure to H.324, Nov. 30-Dec. 2, 2005.

Stephan Wenger et al., Proposed Text for Draft New H.324 Annex K on Fastmedia, Apr. 3-13, 2006, pp. 1-12.

Stephan Wenger et al., Information on Fastmedia Configuration Work for H.324, Apr. 3-13, 2006, pp. 1-7.

ITU-T Telecommunication Standardization Sector of ITU, Multiplexing Protocol for Low Bit Rate Multimedia Communication, Jul. 2001, pp. 1-72.

English translation of the Notice of Preliminary Rejection dated Oct. 22, 2009, issued by the Korean Intellectual Property Office in connection with counterpart Korean Application No. 10-2008-7024160.

Jabri et al., "The 3G-324M Protocol for Conversational Video Telephony", IEEE Multimedia, IEEE Service Center, vol. 11, No. 3, pp. 102-105, Jul. 2004.

ITU Telecommunication Standardization Sector, document Q1-D09, Study Group 16, Q.1/16 Rapporteur Meeting, Biel-Bienne, Switzerland, May 19-20 2005.

English translation of the Office Action dated Feb. 12, 2010, issued by the Patent Office of the Russian Federation, in connection with counterpart Russian application No. 2008138058.

ITU-T, H.263, "*Series H: Audiovisual and Multimedia System Infrastructure of Audiovisual Services-Coding of Moving Video*", Video Coding for Low Bit Rate Communication, Jul. 2005, pp. 1-216.

ITU-T, H.324, "*Series H: Audiovisual and Multimedia Systems Infrastructure of Audiovisual Services-Systems and Terminal Equipment for Audiovisual Services*", Terminal for Low Bit-Rate Multimedia Communication, Sep. 2005, pp. 1-74.

ITU-T, H.245, "*Series H: Audiovisual and Multimedia Systems Infrastructure of Audiovisual Services-Communication Procedures*", Control Protocol for Multimedia Communication, Oct. 2005, pp. 1-330.

\* cited by examiner

METHOD FOR CALL SETUP TIME IMPROVEMENT

The invention relates to call setup technology. In particular, the invention relates to improving call setup speed between at least two 3G-324M compliant systems.

The call setup time, after bearer channel setup, in 3G-324M systems is currently in the order of magnitude of ten to twenty seconds. The resulting user experience is such that users have to wait 10 seconds or even longer for a video phone call to connect, than for a voice call. Thus, a technique for call setup time improvement is required.

The call setup protocol for 3G-324M calls as specified in ITU-T Recommendation H.245, allows for a very flexible interoperation point definition. While this flexibility is generally desirable, many operators have expressed their requirements for the preferred handling of a few interoperation points, so to promote their preferred coding technologies. Other operators expressed a desire for a flexible selection of codecs.

Several proposals have been made in relevant standardization bodies. The two recent ones that have seen the most interest from standardization groups are perhaps FastMedia (FM) and Fast Session Setup (FSS). FastMedia operates by pre-populating the ITU-T Recommendation H.223 Multiplex table with hard-coded operation points, as described in Delayed Contribution D.293 by S. Wenger, T. Hinkkanen, ITU-T SG16 meeting, Geneva, Apr. 3-13, 2006. In other words, the media logical channels are pre-configured with media information that would normally be the outcome of a capability negotiation process. This technology essentially bypasses any capability negotiation in favour of pre-defined operation points, and is therefore a good solution for operators who don't want to see full flexibility (although even FastMedia, as originally proposed, allows for the full H.245 cap exchange with a delay of more than 10 seconds). The class of channel setup technologies FM belongs to can be denoted as Preconfigured Media (PM).

Several other proposals have been made that aim at speeding up the capability exchange. One example of these technologies is the one disclosed in Q1-E-16, "Fast Session Setup (FSS)" by B. Kenrick, A. Wong, Q.1/16 Rapporteur's Meeting, Geneva, Switzerland, 30 Nov.-2 Dec. 2005. This class of technologies is henceforth denoted as Fast Logical Channel Setup (FLCS) techniques. FLCS techniques have in common that they comprise a flexible H.245-type logical channel operation point negotiation without the disadvantage of the many round trip delays of H.245. Most of these techniques operate by signaling a pre-configured channel setup.

PM and FLCS technologies cannot simply co-exist in the same terminal as proposed in the aforementioned standardization contributions, since they employ similar mechanisms to announce their presence and transport their data. For example, the original FastMedia proposal announces its presence by intentional syntax violations of the H.223 Annex B multiplex layer's flag concept, whereas the original FSS proposal announces its presence by sending the information on the bearer channel before flags are being sent, thereby (unintentionally) also violating H.223 mux (multiplex) layer syntax. Conventional H.245 uses the pre-assigned H.223 channel 0 for slow session setup.

To overcome the above problems, according to the invention a method and an apparatus for providing fast and flexible call setup are proposed.

The method comprises establishing a plurality of Preconfigured Channels (henceforth denoted as phantom channels) over a bearer channel, wherein at least one of the plurality of phantom channels is pre-assigned to a first session negotiation method, at least one of remaining phantom channels of the plurality of phantom channels is pre-assigned to a second session negotiation method, the second session negotiation method has at least one property different from the first session negotiation method, and at least one of the remaining phantom channels is assigned to at least one fixed media operation point, whereby the first session negotiation method is utilized for flexible session setup.

According to an embodiment of the invention, the first session negotiation method is a Fast Logical Channel Setup procedure, and the second session negotiation method conforms to ITU-T Recommendation H.245.

According to another embodiment of the invention, the first session negotiation method conforms to ITU-T Recommendation H.324 Annex A.4 (Windowed Numbered SRP Response Frames, WNSRP), and the second session negotiation method conforms to ITU-T Recommendation H.245.

The property different from the first session negotiation method may be the speed of the session negotiation method.

The fixed media operation point may be the use of ITU-T Recommendation H.263 baseline for video.

The presence of an implementation of an FLCS procedure may be signaled during a Fast Media procedure using an H.245 Terminal Capability Set message. The Fast Logical Channel Setup procedure may be started in a state FM_trying of the Fast Media procedure, before the H.245 Terminal Capability Set message has been received.

The invention proposes a combination of FM and FLCS technology, whereby the FLCS technology utilizes an FM phantom channel. In particular, the invention proposes to use two different H.223 logical channels for different H.245-like call setup methods.

In another embodiment, the invention proposes a combination of FM and WNSRP technology, whereby the WNSRP technology utilizes a DM phantom channel. In this embodiment, the invention proposes to use two different H.223 logical channels for WNSRP and original H.245, and simultaneously makes available media on at least one phantom channel.

For the reasons presented, a combination of FastMedia with FLCS is desirable. According to the invention, one of FastMedia's phantom channels is pre-allocated to convey the FLCS messages. If systems wish to connect using the codec choices available in the pre-populated H.223 mux table, they don't need to use FLCS. If there are no codecs available in the pre-populated H.223 mux table, or if there is no interoperation (FastMedia Fallback doesn't lead to interoperability, as described in D.293), then FLCS may be invoked, using the pre-assigned Phantom channel for FLCS. As a result, a full H.245-like session negotiation takes place, which may benefit from the fast call setup of FLCS.

The solution according to the invention allows for a very fast call setup at preferred operation points, if the H.223 mux tables of both connecting systems include at least one interoperability point. The mechanism is only slightly slower if it has to fallback to FLCS. Therefore, requirements of operators requiring full flexibility and of operators requiring control over preferred codecs are both met.

In the following the invention will be described by way of a preferred embodiment thereof referring to the accompanying drawings, in which.

DESCRIPTION OF THE PREFERRED EMBODIMENT

In the following a preferred embodiment of the invention will be described using the FSS proposal, as disclosed in Q1-E-16, as one example of an FLCS procedure. The content of the Q1-E-16 is included herewith by reference.

The features of FSS most relevant for the invention are presented in the following. Details are available in Q1-E-16.

When conventional FSS is in use, after bearer setup the terminal emits FSS frames. An FSS frame consists of a Frame Information field comprising sequencing information, the frame's payload, and a CRC for error detection. Within the frames, amongst others, "media Profile" information data structures can be conveyed. Each media Profile consists of all the information that is available in legacy terminals after the success of the Open Logical Channel procedure. FSS successfully connects, as soon a terminal has successfully received sufficient information to open the logical channels required (e.g. audio and video).

According to the invention, after bearer setup, the FastMedia procedure attempts to connect, as disclosed in D.293 and Delayed Contribution D.294 by S. Wenger, T. Hinkkanen, ITU-T SG16 meeting, Geneva, Apr. 3-13, 2006. The contents of D.293 and D.294 are herewith incorporated by reference.

In particular, as described in D.293, when the Fast Media Procedure is in use, several of the H.223 multiplex table entries are defined to reference preconfigured media channels, which are default media operation points of certain codecs. These default media operation points may be used to quickly establish media channels, called Phantom Channels. Once a Phantom Channel is established, it exists until a logical channel of the same media type (audio or video) is established using for example the regular H.245 OpenLogicalChannel procedures. Terminals supporting the Fast Media procedure may use the established Phantom Channels for the duration of the session, or they may negotiate replacements using for example H.245.

The multiplex table or mux table, according to ITU-T Rec. H.223, is a table with up to 16 entries which specifies a multiplexing pattern for an information field of a MUX-PDU (Multiplex Protocol Data Unit) which is an information unit exchanged between peer MUX layer entities. The MUX layer is the lower of two layers of a multiplexer described in ITU-T Recommendation H.223, "Multiplexing protocol for low bit rate multimedia communication", July 2001.

Figure 1:
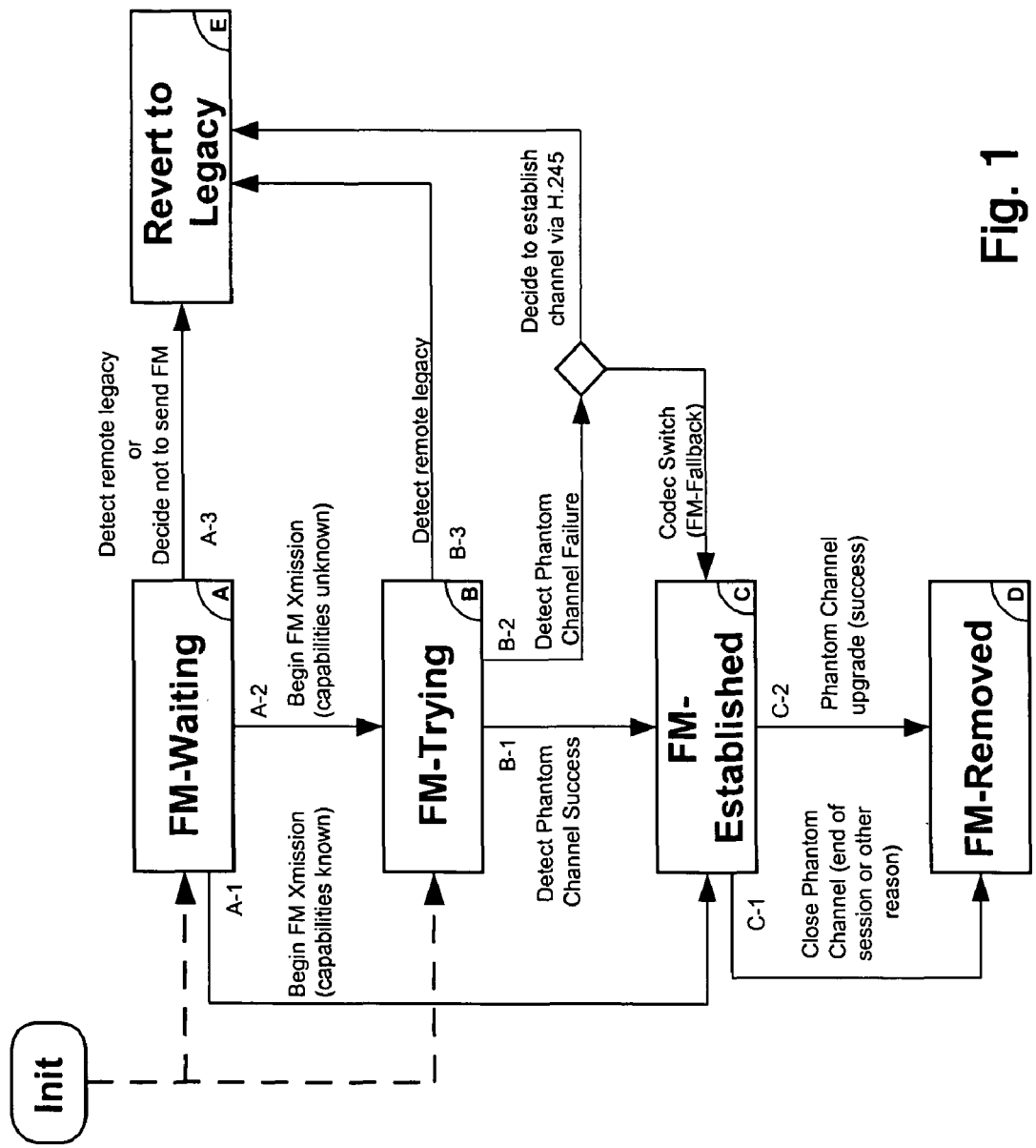
FIG. 1 shows a Fast Media state diagram (outgoing) according to the FastMedia procedure described in D.293.

FIG. 1 shows a Fast Media state diagram (outgoing) according to the FastMedia procedure described in D.293. The sending side of an FM terminal operates according to the state diagram depicted in FIG. 1. For each media type (audio and video), a terminal maintains separate state machines.

The states and state transitions are detailed as follows:
 (A) FM-Waiting—The terminal has not yet sent any Phantom Channel data for the given media type, however it reserves the option to do so. While in this state, the terminal proceeds with standard level setup (Level 2) as well as H.245 TerminalCapabilitySet (TCS) and MasterSlaveDetermination (MSD) procedures. It includes FMCapability in the outgoing H.245 TerminalCapabilitySet request. In this state, the terminal may also be responsive to signalling means on the bearer channel indicating the use of FM or other call setup acceleration techniques.
  A-1: The terminal receives a message indicating the use of FM. One example for such a message is an incoming H.245 TerminalCapabilitySet request including an FMCapability object. Another example consists of a signalling means on the bearer channel conveying essentially the same information. The terminal initiates an appropriate outgoing transmission. The resulting Phantom Channel is instantly established.
  A-2: The terminal has not received the incoming H.245 TerminalCapabilitySet request or signalling means on the bearer channel, but decides to attempt an outgoing transmission. This may be triggered by implementation-specific events.
  A-3: The terminal decides not to use outgoing FM procedures, and to instead establish the channel using for example H.245 procedures. This transition may be triggered upon receipt of an incoming H.245 TerminalCapabilitySet lacking the FMCapability object, by the reception of signalling means on the bearer channel indicative of the lack of FM capability on the remote side, or upon expiration of a timeout period during which the FM Capabilities of the remote terminal cannot be determined. This transition may also be triggered by implementation-specific events.
 (B) FM-Trying—The terminal is currently transmitting Phantom Channel data for the given media type, but it has not yet discovered whether the Phantom Channel is successfully established. Stuffing blocks shall be included in the transmission until the completion of level setup. If not already completed, the terminal proceeds through H.245 TerminalCapabilitySet and MasterSlaveDetermination procedures, and includes the FMCapability object in the outgoing H.245 TerminalCapabilitySet.
  B-1: The terminal receives the incoming H.245 TerminalCapabilitySet request, or means on the bearer channel, and discovers through this information that the current transmission is acceptable to the remote FM terminal. The Phantom Channel is established.
  B-2: The terminal receives the incoming H.245 TerminalCapabilitySet request including an FMCapability object, or means on the bearer channel. It finds that the current transmission of media data is not acceptable to the remote terminal. In this case, the terminal may advantageously drop the current transmission. If there is an alternate FM codec option for the same media type (audio or video) which the remote terminal does support, the terminal may advantageously begin a new transmission and so execute the FM-Fallback procedure. In this case, the Phantom Channel is instantly established. Otherwise the terminal may revert to H.245 OpenLogicalChannel procedures or other channel setup technologies in order to open the channel.
  B-3: The terminal determines that the remote terminal is a non-FM legacy terminal, and therefore reverts to non-FM signaling in order to establish the channel. This transition has two possible triggers:
   Receipt of incoming H.245 TerminalCapabilitySet or means on the bearer channel indicative of lacking the FMCapability object.
   Expiration of a timeout period during which the FM Capabilities of the remote terminal cannot be determined.
 (C) FM-Established—The terminal has successfully established an outgoing Phantom Channel of the given media type.

C-1: The terminal ends the session or terminates the Phantom Channel transmission for some other reason.

C-2: The terminal decides to replace the established Phantom Channel, and therefore initiates H.245 procedures to open a new channel of the same media type. The replacement channel is successfully established, and at that point the Phantom Channel transmission may be dropped. Note that this transition is valid only if the remote terminal has included the acceptChannelUpgrades parameter in the FMCapability object.

(D) FM-Removed—The terminal has discontinued transmission of a previously-established Phantom Channel. The outgoing FM state machine is no longer active.

(E) Revert to Legacy—The terminal establishes the channel using, for example, regular H.245 OpenLogicalChannel procedures. The outgoing FM state machine is no longer active.

Figure 2:
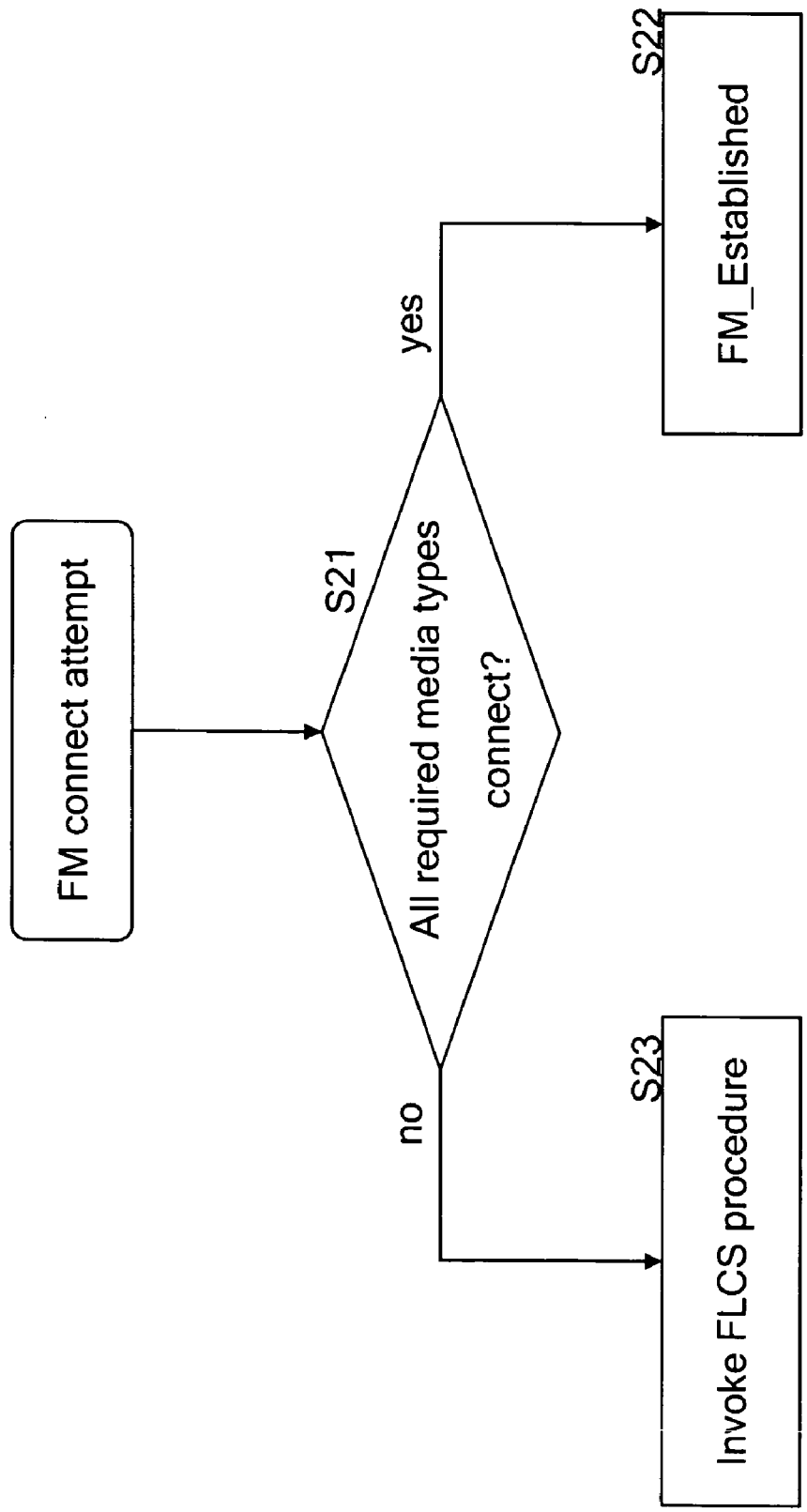
FIG. 2 shows a flow chart illustrating an embodiment of the invention.

FIG. 2 shows a flow chart illustrating a call setup procedure according to the invention.

As mentioned above, after bearer setup, the FastMedia procedure attempts to connect. According to the invention as illustrated in FIG. 2, if all required media types (for example audio and video) connect (YES in step S21), there is no need to invoke any further session setup mechanism, and a state FM_ESTABLISHED is entered (step S22). This state is denoted as FM_ESTABLISHED in FIG. 1.

If FastMedia fails (for whatever reason) (NO in step S21), state Revert-to-Legacy in FIG. 1, according to the invention, instead of falling back to legacy and slow H.245, instead the FLCS procedure, if present, is invoked as shown in FIG. 2 (step S23).

It is possible to implement terminals that always contain a FLCS procedure. However, advantageously, the presence of a FLCS procedure is signalled in the Fast FastMedia Terminal Capability Set message (TCS) or by means on the bearer channel indicative of the preference of using FLCS. In this case, advantageously, the FLCS procedure is invoked only if the TCS message or the means on the bearer channel have signalled the availability of the FLCS procedure. Otherwise the legacy (H.245) procedure may be invoked.

It is also possible to start the FLCS procedure even before the TCS message has been successfully received, e.g. in the state FM_trying. In this case, the receiving side necessarily requires removing all FLCS data it does not understand, for example because it does not implement the FLCS procedure. The same state machine operation as for the media channels, and described above, applies. That is, immediately after bearer setup, the terminal starts emitting FLCS codepoints over a pre-assigned bearer channel. A receiving terminal can utilize these code points to establish an FLCS based connection, without waiting for FLCS capability announcement in the TCS message.

According to the prior art, the FLCS procedure utilizes the bearer channel for its traffic directly. In case of FSS this implies sending the FSS frames directly over the bearer channel. According to the invention, instead a FM phantom channel pre-assigned for this purpose is utilized. This channel (for example channel 14) is different from the channel utilized for H.245 traffic (which is channel 0).

Figure 3:
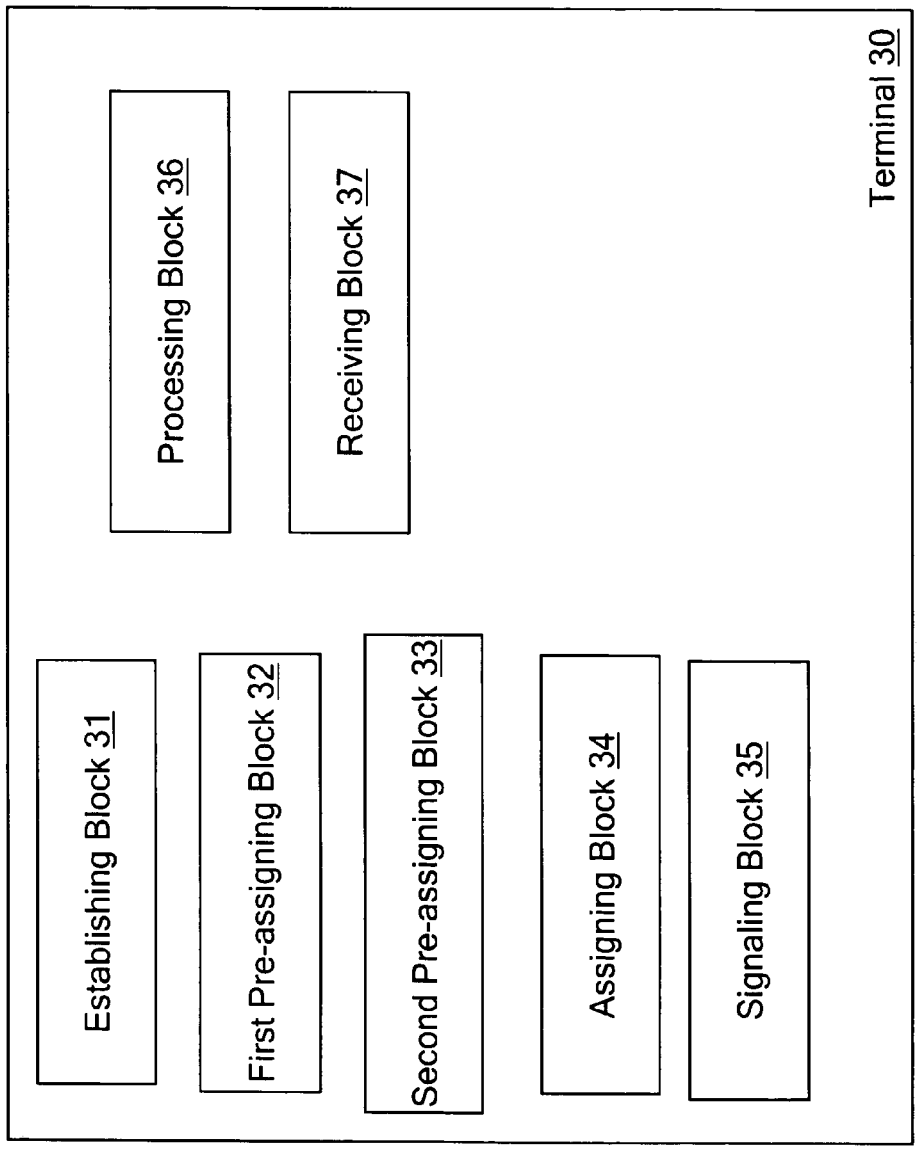
FIG. 3 shows a block diagram illustrating a terminal according to an embodiment of the invention.

FIG. 3 shows a block diagram illustrating a terminal 30. The terminal 30 comprises an establishing block 31, a first pre-assigning block 32, a second pre-assigning block 33 and an assigning block 34. The terminal 30 may further comprise a signalling block 35, a processing block 36 and a receiving block 37.

The establishing block 31 establishes a plurality of phantom channels over a bearer channel, wherein the first pre-assigning block 32 has pre-assigned at least one of the plurality of phantom channels to a first session negotiation method, and the second pre-assigning block 33 has pre-assigned at least one of remaining phantom channels of the plurality of phantom channels to a second session negotiation method. The second session negotiation method has at least one property different from the first session negotiation method. The assigning block 34 has assigned at least one of the remaining phantom channels to at least one fixed media operation point. The first session negotiation method is utilized for flexible session setup.

The first pre-assigning block 32 may comprise a Fast Logical Channel Setup procedure for the first session negotiation method. The second pre-assigning block 33 may comprise the second session negotiation method conforming to ITU-T Recommendation H.245.

The first session negotiation method may be a Fast Logical Channel Setup procedure, the presence of an implementation of the Fast Logical Channel setup procedure may be signaled during a fast media procedure by the signaling block 35 using an H.245 terminal capability set message, and the fast logical channel setup procedure may be started by the processing block 36 in a state FM_trying of the fast media procedure, before the H.245 terminal capability set message has been received by the receiving block 37. The first session negotiation method may also comprise a WNSRP procedure and the second session negotiation method may conform to ITU-T recommendation H.245.

It is to be noted that the terminal shown in FIG. 3 may have further functionality for working as terminal device. Here the functions of the terminal device relevant for understanding the principles of the invention are described using functional blocks as shown in FIG. 3. The arrangement of the functional blocks of the terminal device is not construed to limit the invention, and the functions may be performed by one block or further split into sub-blocks.

For the purpose of the present invention as described above, it should be noted that method steps likely to be implemented as software code portions and being run using a processor at the terminal device are software code independent and can be specified using any known or future developed programming language;

method steps and/or devices likely to be implemented as hardware components at the terminal device are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:
1. A method comprising:
establishing, by at least one processor, a plurality of phantom channels over a bearer channel, wherein at least one of the phantom channels comprise a media channel associated with a predetermined codec;
pre-assigning, by the at least one processor, at least one of the plurality of phantom channels to a first session negotiation method;
pre-assigning, by the at least one processor, at least one of remaining phantom channels of the plurality of phantom channels to a second session negotiation method, wherein the second session negotiation method has at least one property different from the first session negotiation method;
assigning, by the at least one processor, at least one of the remaining phantom channels to at least one fixed media operation point, whereby the first session negotiation method is utilized for flexible session setup; and
in response to failing to transmit one or more pre-determined media types to establish a communication, reverting to the second session negotiation method when the first session negotiation method is not available.

2. The method of claim 1,
wherein the phantom channels comprise preconfigured media channels providing default media operation points for at least the predetermined codec, and
wherein the first session negotiation method comprises a fast logical channel setup procedure utilizing a pre-assigned fast media phantom channel.

3. The method of claim 2, wherein the fast logical channel setup procedure is signaled during a fast media procedure using an H.245 terminal capability set message.

4. The method of claim 1, wherein the first session negotiation method comprises a windowed numbered simple retransmission protocol procedure.

5. The method of claim 1, wherein the second session negotiation method conforms to International Telecommunication Union Telecommunication Standardization Sector (ITU-T) Recommendation H.245.

6. The method of claim 1, wherein the at least one property different from the first session negotiation method is a speed of the session negotiation method.

7. The method of claim 1, wherein the at least one fixed media operation point is the use of International Telecommunication Union Telecommunication Standardization Sector (ITU-T) Recommendation H.263 baseline for video.

8. The method of claim 1, wherein the first session negotiation method is a fast logical channel setup procedure, the presence of an implementation of the fast logical channel setup procedure is signaled during a fast media procedure using an H.245 terminal capability set message, and the fast logical channel setup procedure is started in a state FM_trying of the fast media procedure, before the H.245 terminal capability set message has been received.

9. An apparatus comprising:
at least one processor; and
at least one memory including code, which when executed by the at least one processor provides operations comprising:
establishing a plurality of phantom channels over a bearer channel, wherein at least one of the phantom channels comprise a media channel associated with a predetermined codec;
pre-assigning at least one of the plurality of phantom channels to a first session negotiation method;
pre-assigning at least one of remaining phantom channels of the plurality of phantom channels to a second session negotiation method, the second session negotiation method having at least one property different from the first session negotiation method;
assigning at least one of the remaining phantom channels to at least one fixed media operation point, whereby the first session negotiation method is utilized for flexible session setup; and
reverting to the second session negotiation method when the first session negotiation method is not available in response to failing to transmit one or more pre-determined media types to establish a communication.

10. The apparatus of claim 9, wherein the first session negotiation method comprises a fast logical channel setup procedure for the first session negotiation method.

11. The apparatus of claim 9, wherein the first session negotiation method comprises a windowed numbered simple retransmission protocol procedure for the first session negotiation method.

12. The apparatus of claim 9, wherein the second session negotiation method conforms to International Telecommunication Union Telecommunication Standardization Sector (ITU-T) Recommendation H.245.

13. The apparatus of claim 9, wherein the first session negotiation method is a fast logical channel setup procedure, the presence of an implementation of the fast logical channel setup procedure is signaled during a fast media procedure using an H.245 terminal capability set message, and the fast logical channel setup procedure is started in a state FM_trying of the fast media procedure, before the H.245 terminal capability set message has been received.

14. An apparatus comprising:
an establishing unit configured to establish a plurality of phantom channels over a bearer channel, wherein at least one of the phantom channels comprise a media channel associated with a predetermined codec;
a first pre-assigning unit configured to pre-assign at least one of the plurality of phantom channels to a first session negotiation method;
a second pre-assigning unit configured to pre-assign at least one of remaining phantom channels of the plurality of phantom channels to a second session negotiation method, the second session negotiation method having at least one property different from the first session negotiation method;
an assigning unit configured to assign at least one of the remaining phantom channels to at least one fixed media operation point, whereby the first session negotiation method is utilized for flexible session setup; and
a reverting unit configured to revert to the second session negotiation method when the first session negotiation method is not available in response to failing to transmit one or more pre-determined media types to establish a communication, wherein the establishing unit, the first pre-assigning unit, the second pre-assigning unit, the assigning unit, and the reverting unit are implemented in at least one processor.

15. The apparatus of claim 14, wherein the first pre-assigning unit comprises a fast logical channel setup procedure for the first session negotiation method.

16. The apparatus of claim 14, wherein the first pre-assigning unit comprises a windowed numbered simple retransmission protocol procedure for the first session negotiation method.

17. The apparatus of claim 14, wherein the second pre-assigning unit comprises the second session negotiation method conforming to International Telecommunication Union Telecommunication Standardization Sector (ITU-T) Recommendation H.245.

18. The apparatus of claim 14, wherein the first session negotiation method is a fast logical channel setup procedure, the presence of an implementation of the fast logical channel setup procedure is signaled during a fast media procedure using an H.245 terminal capability set message, and the fast logical channel setup procedure is started in a state FM_trying of the fast media procedure, before the H.245 terminal capability set message has been received.

19. A non-transitory computer readable storage medium encoded with at least one instruction which is executed by a processor to perform at least the following:
    establishing a plurality of phantom channels over a bearer channel, wherein at least one of the phantom channels comprise a media channel associated with a predetermined codec;
    pre-assigning at least one of the plurality of phantom channels to a first session negotiation method;
    pre-assigning at least one of remaining phantom channels of the plurality of phantom channels to a second session negotiation method, wherein the second session negotiation method has at least one property different from the first session negotiation method;
    assigning at least one of the remaining phantom channels to at least one fixed media operation point, whereby the first session negotiation method is utilized for flexible session setup; and
    in response to failing to transmit one or more pre-determined media types to establish a communication, reverting to the second session negotiation method when the first session negotiation method is not available.

20. The non-transitory computer readable storage medium according to claim 19, wherein the at least one instruction is directly loadable into an internal memory of a processing device.

* * * * *